US006973975B1

(12) United States Patent
Adamson et al.

(10) Patent No.: US 6,973,975 B1
(45) Date of Patent: Dec. 13, 2005

(54) UNIVERSAL TRANSPORTABLE COMPRESSED AIR FOAM FIRE FIGHTING SYSTEM

(75) Inventors: Keith Adamson, Los Angeles, CA (US); John R. Grindley, Los Angeles, CA (US); Robert M. Grindley, Los Angeles, CA (US)

(73) Assignee: Robwen Inc., Los Angeles, CA (US)

( * ) Notice: Subject to any disclaimer, the term of this patent is extended or adjusted under 35 U.S.C. 154(b) by 49 days.

(21) Appl. No.: 10/648,753

(22) Filed: Aug. 25, 2003

Related U.S. Application Data

(60) Provisional application No. 60/409,717, filed on Sep. 10, 2002.

(51) Int. Cl.[7] ........................ A62C 27/00; A01G 25/09

(52) U.S. Cl. ............................ 169/24; 169/51; 169/72; 239/172; 239/722

(58) Field of Search ................................ 239/172, 722; 169/51, 72, 24

(56) References Cited

U.S. PATENT DOCUMENTS 4,633,895 A * 1/1987 Eberhardt .................... 137/98
5,009,244 A * 4/1991 Grindley et al. ....... 137/101.11
5,165,442 A * 11/1992 Grindley et al. ....... 137/118.04
RE35,362 E * 10/1996 Arvidson et al. ............. 169/13
RE36,196 E * 4/1999 Eberhardt .................... 169/14
6,009,953 A * 1/2000 Laskaris et al. .............. 169/13
6,357,532 B1 * 3/2002 Laskaris et al. .............. 169/43
6,725,940 B1 * 4/2004 Klein et al. ................... 169/15
6,733,004 B2 * 5/2004 Crawley .................... 261/18.1
6,766,863 B2 * 7/2004 Arvidson et al. ............. 169/14

* cited by examiner

*Primary Examiner*—David A. Scherbel
*Assistant Examiner*—Seth Barney
(74) *Attorney, Agent, or Firm*—John E. Wagner; Robert C. Smith

(57) ABSTRACT

A compressed air/foam fire fighting system which is sufficiently compact to be carried on the bed of a pick-up truck includes a water tank, a pump for providing water at substantial pressure to a water conduit, an engine for driving the pump, a foam reservoir including a bladder tank connected to the pump, an air compressor, an engine for driving the air compressor, a differential pressure valve connected in the water conduit, a metering valve adjustable to supply a desired proportion of foam concentrate to water connected across the differential pressure valve, an air valve for controlling the amount of air from said compressor, and an air injection venturi for mixing air into a water/foam concentrate. A two-way valve connected between the tank and the pump is movable between a first position where water is pumped from the water tank and a second or suction position where water is drawn from an outside tank or other source. The system can supply plain water, a water/foam mixture, a mixture of compressed air, water, and foam, or compressed air only.

27 Claims, 8 Drawing Sheets

To Hose Reel
WATER PUMP ENGINE
52
E2
55
12
18
T1
C1
T2
C2

FIG 8
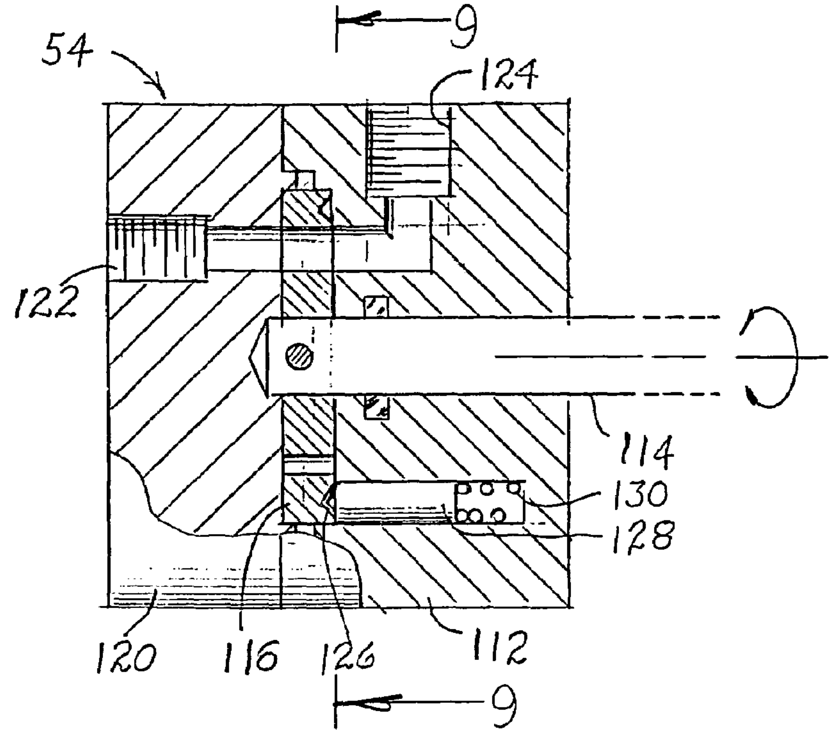
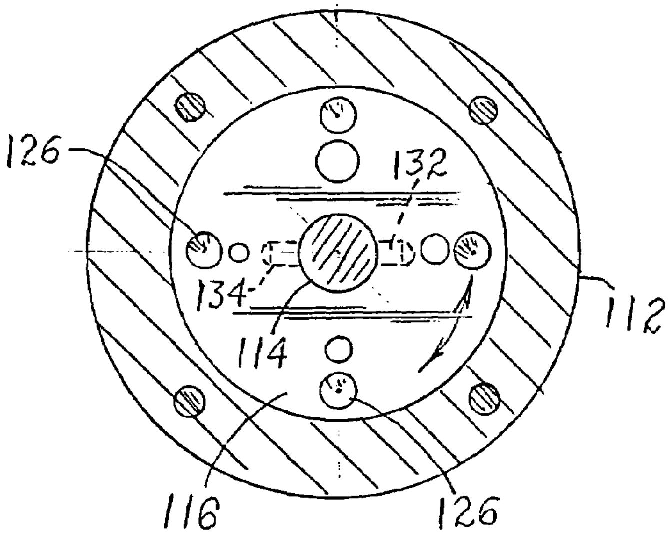
FIG 9

UNIVERSAL TRANSPORTABLE COMPRESSED AIR FOAM FIRE FIGHTING SYSTEM

REFERENCE TO RELATED APPLICATION

This Non-Provisional Patent Application is based upon U.S. Provisional Patent Application Ser. No. 60/409,717 filed Sep. 10, 2002, and hereby claims the benefit of the embodiments therein and of the filing date thereof.

FIELD OF THE INVENTION

This invention relates to the field of fire fighting, and more particularly, to compressed air foam systems (CAFS) for controlling the flow of fire fighting fluids which employ foam-producing additives to water to be delivered by a hose from a pressurized source, such as a pump, a fire hydrant, or from such other sources, such as a tank, a stream or a lake.

BACKGROUND OF THE INVENTION

There are many situations where it would be desirable to have a compact, relatively portable fire-fighting system readily available, particularly in forest or brush areas or in remotely located neighborhoods where full scale fire-fighting equipment is not readily available or accessible. Such a compact system should, to the extent possible, make use of the most advanced fire-fighting technology available.

The use of foam additives to water in fighting fires is well recognized as a major advance in improving the effectiveness in retarding ignition, extinguishing blazes, preventing re-ignition of burnable materials, and in indicating a coverage in both airborne drops and ground operations. Foam is particularly suited for use in forest or brush areas where it will also act as a wetting agent, exhibiting good cooling capability by blanketing burnable materials, and reducing smoke by the blanketing effect.

This system employs our previously patented foam mixing system, which is the subject of U.S. Pat. No. 5,009,244, assigned to the assignee of the present patent application, which discloses a system for mixing foam concentrate, such as a product of Ansul Wormold Corp. of Marionette, Wis., sold under the trademark ANSUL, with water in such a way that the precise desired proportion of foam concentrate is mixed with water irrespective of the quantity of water supplied to fight a fire. A significant element of this system is a differential pressure valve, the subject of U.S. Pat. No. 5,165,442, which is also assigned to the assignee of the present application. Both of the above patents are hereby incorporated by reference.

Fire fighters are concerned with the ratio of foam concentrate to water and also to the ratio of water/foam concentrate to air. If the foam concentrate provided is too low (below about 0.2%), this will result in pulsations (water slugs) in the hose. This is because there is not enough foam concentrate in the solution to form foam in the hose. A somewhat higher ratio will yield a "wetter" appearing foam. A still higher ratio will yield a "drier" appearing foam. Varying degrees of dryness or wetness are appropriate for combating different types of fires.

Because the ratio of air to water/foam solution is recognized as being very important to getting the desired type of foam output, other systems have used separate flow meters for air and for the water/foam concentrate mix. This arrangement is difficult to operate because it leaves one operator, the engineer, juggling the air and water/foam valves in an attempt to produce the desired output at the end of the hose, while the second operator, the firefighter, at the end of the hose may well be out of sight and out of earshot. So, although the second operator might recognize that the ratio was not what was needed (more or less water/foam concentrate in proportion to air), he might have difficulty conveying to the operator the need for and the kind of change needed for controlling the flow.

It is, therefore, an object of the present invention to provide a compressed air foam fire-fighting system having controls capable of setting and maintaining desired ratios of water/foam concentrate to compressed air.

It is another object of the present invention to provide a fire-fighting system incorporating the above objective, and in which the entire system is built into a framework small enough to fit in the bed of a typical full size pick-up truck.

It is a further object of the present invention to provide a fire-fighting system incorporating the above objectives and in which the ratio of foam concentrate to water is maintained irrespective of a volume of water delivered to the system.

It is a still further object of the present invention to provide a fire-fighting system incorporating the above objectives and which is capable of delivering water, water/foam concentrate, water/foam concentrate mixed with compressed air and air alone.

Other objects and advantages will become apparent from consideration of the following specification taken in connection with the accompanying drawings.

BRIEF SUMMARY OF THE INVENTION

This invention involves a universal fire fighting system, which is designed to be easily transportable by fire fighting personnel to a fire scene where the use of compressed air, foam/water fluids, as well as water alone or aspirated foam/water fluid, is used. The water may be supplied by a portable or fixed tank, a hydrant, or from another water source, such as a lake, stream or a swimming pool.

The system, which can be carried on a pick-up truck, includes two small internal combustion engines, one of which drives a water pump, which may be connected to an integral tank or another water source and the other, which drives the air compressor for the system. Each engine has separate, independent controls. A control panel accessible at the rear of the pick-up truck contains controls for the engines, such as ignition and starter switches and choke and throttle controls. A number of gauges are included and switches for controlling the rate of flow of water, water/foam concentrate or compressed air. Valves are included for controlling water input, water or aspirated foam output, or compressed air/foam or air only outputs and a water drain line.

The patented foam mixing system of U.S. Pat. No. 5,009,244 includes a metering valve which can be positioned or set to provide a precisely metered proportion of foam concentrate to water. A differential pressure valve applies discharge water pressure to the foam concentrate as a function of the flow through the main water line. In this manner, the system acts to maintain the desired proportion of foam concentrate to water irrespective of the volume of water delivered. Where only a water/foam solution is desired, this solution is supplied to a specific discharge conduit, including a two-way valve.

When it is desired to combine the water/foam solution with air, the two-way valve controlling the output of water or water/foam solution is closed and the water/foam solution from the differential pressure valve is supplied to a foam solution metering valve which includes a movable plate having a plurality of ports, each calibrated to a different desired flow rate. The output of the foam solution-metering valve is then fed to an air injection venturi that includes ports for the injection of air into the foam solution from the foam solution-metering valve.

Air, under a substantial known pressure, is supplied by an engine-driven compressor and is fed to an air metering valve which includes a movable plate having a plurality of ports calibrated to supply compressed air in measured quantities at a known pressure. This selected airflow is connected to the air injection venturi which includes a series of ports at the throat of the venturi through which the air is injected. Thus, it will be understood that with precisely calibrated ports in both the foam solution metering valve and the air valve, the ratio of foam solution to air is controlled and maintained, and the system operators can rely on the ratio remaining and the system operators can rely on the ratio remaining as selected.

The modes of operation of this system are:

1. to supply water at the desire flow rate, either
   a) from a self-contained tank or a tank on an associated vehicle; or
   b) from an external source, such as a lake, stream, or swimming pool;
2. to supply a controlled ratio of foam concentrate mixed with water, which ratio remains essentially the same irrespective of the rate of water flow selected;
3. to supply controlled ratios of compressed air mixed with foam concentrate and water; and
4. to supply compressed air only.

BRIEF DESCRIPTION OF THE DRAWINGS

This invention may be more clearly understood from the following detailed description and by reference to the drawings in which:

FIG. 8 is a vertical sectional view of the air metering valve;

FIG. 9 is a sectional view taken along line 9—9 of FIG. 8;

DETAILED DESCRIPTION

Figure 1:
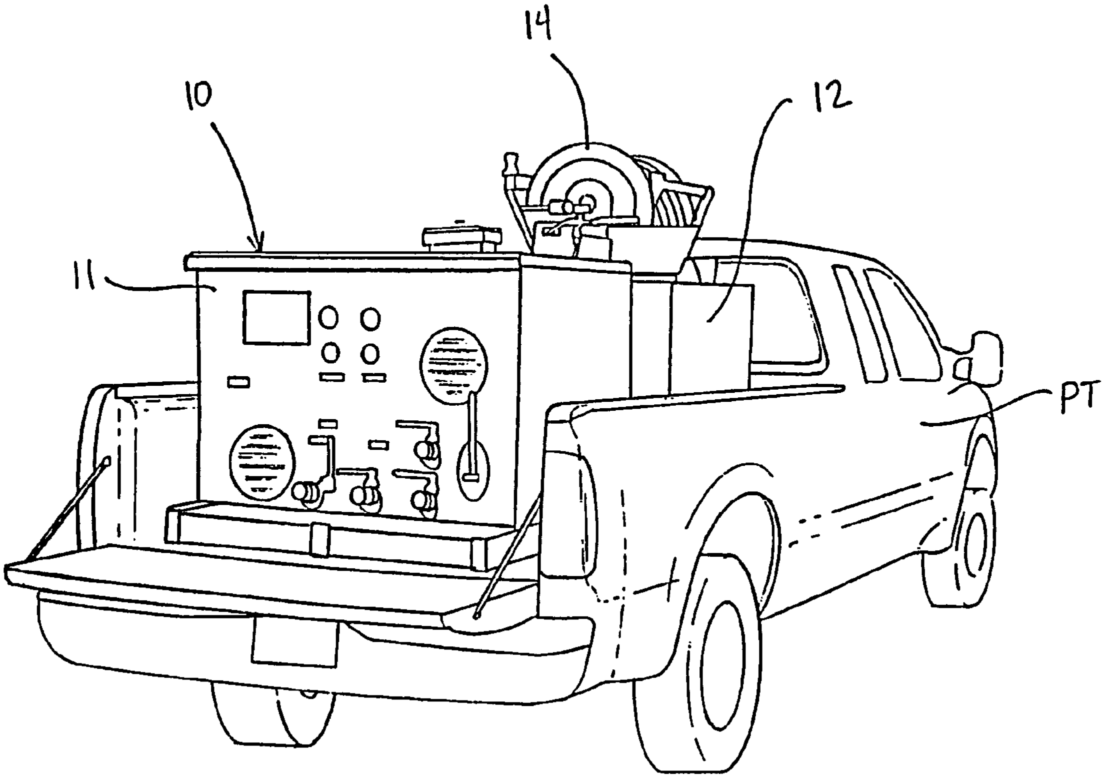
FIG. 1 is a perspective view of a truck-mounted system of this invention.

Referring now to FIG. 1, applicants' fire fighting system 10 is shown carried in the bed of a pick-up truck PT. The system 10 is a complete integrated system mounted on and secured to a frame and includes a control panel 11 readily accessible from the back of the pick-up. Also carried in the bed of pick-up truck PT are a water tank 12 and a hose reel 14. All inlet and outlet port valves are located on the control panel.

Figure 2:
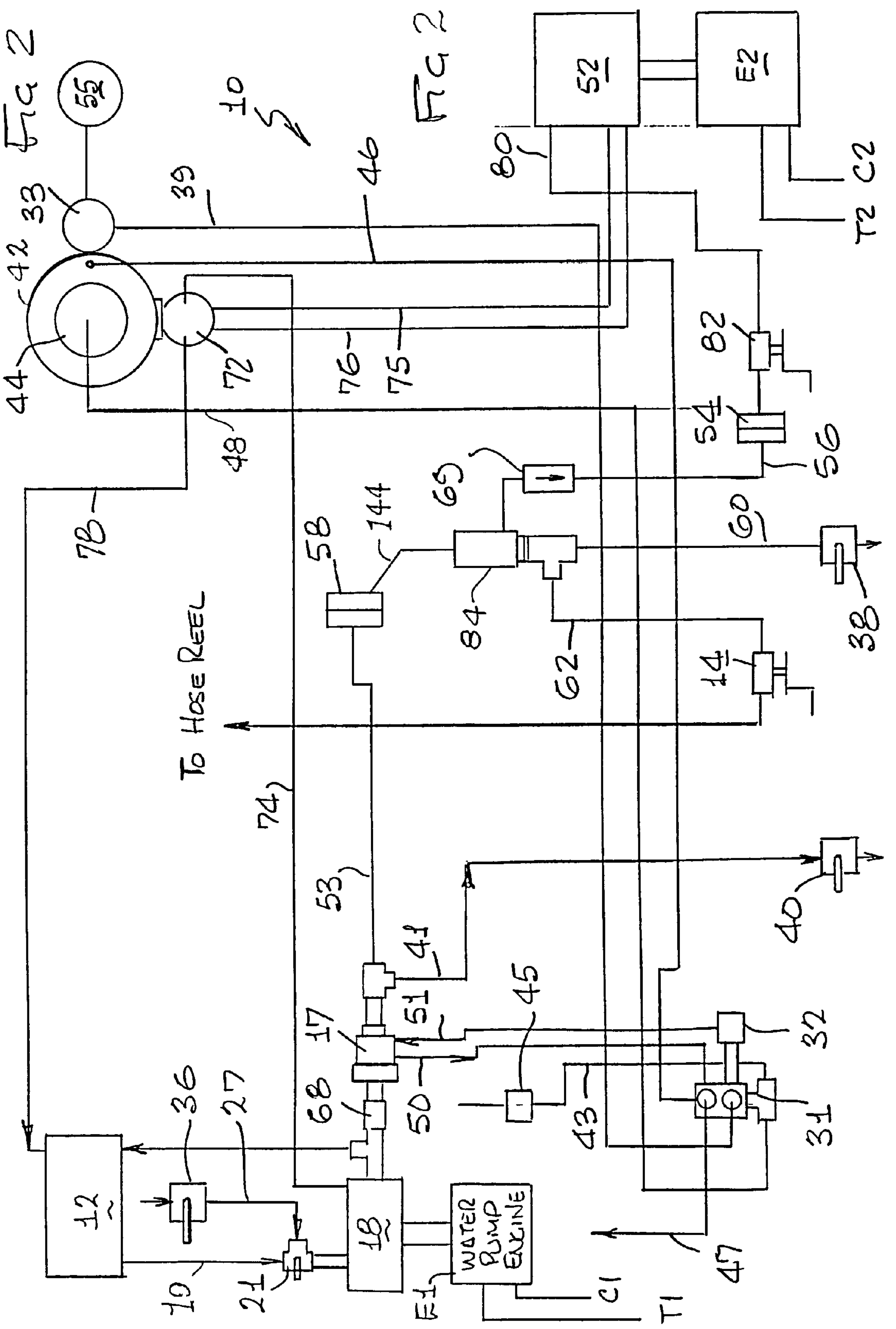
FIG. 2 is a schematic block diagram of this invention.

FIG. 2 is a schematic block diagram of the system 10 in which engine E1 drives a water pump 18, which is connected to water tank 12 through a pipe 19 and a two-way valve 21. Valve 21, in one position, directs water directly from tank 12 to pump 18; in its other position, it connects pump 18 with an input line (suction) 27 including a valve 36 for drawing water from an outside source which could be a lake, hydrant, swimming pool or a water truck. Fire fighting water from whatever source is pumped past a check valve 68 to a differential pressure valve 17, which corresponds to the differential pressure valve of U.S. Pat. No. 5,009,244 referred to above and which is incorporated by reference and attached to this application. Differential pressure valve 17 maintains a pre-set ratio of foam concentrate to water supplied despite wide variations in flow rate of the mixture.

Foam is supplied from a bladder tank 42 which incorporates a flexible bladder 44 containing a Class A foam concentrate, such as the agents sold under the trademark Sylvex of the Ansul Company of Marionette, Wis. Bladder 44 is contained within tank 42 such that it is surrounded by water, which is connected to tank 12 through a water conduit 46 from a three-way selector valve 31 in line with differential pressure valve 17. The three-way selector valve 31 and metering valve 32, both of which are described in detail in U.S. Pat. No. 5,009,244, are controlled by means of controls on a selector panel 30 forming part of control panel 11 discussed below. Also connected to three-way selector valve 31 through a conduit 39 is a refill pump 33 which supplies foam concentrate from a source 55 to bladder tank 42.

Water/Foam Supply

Figure 3:
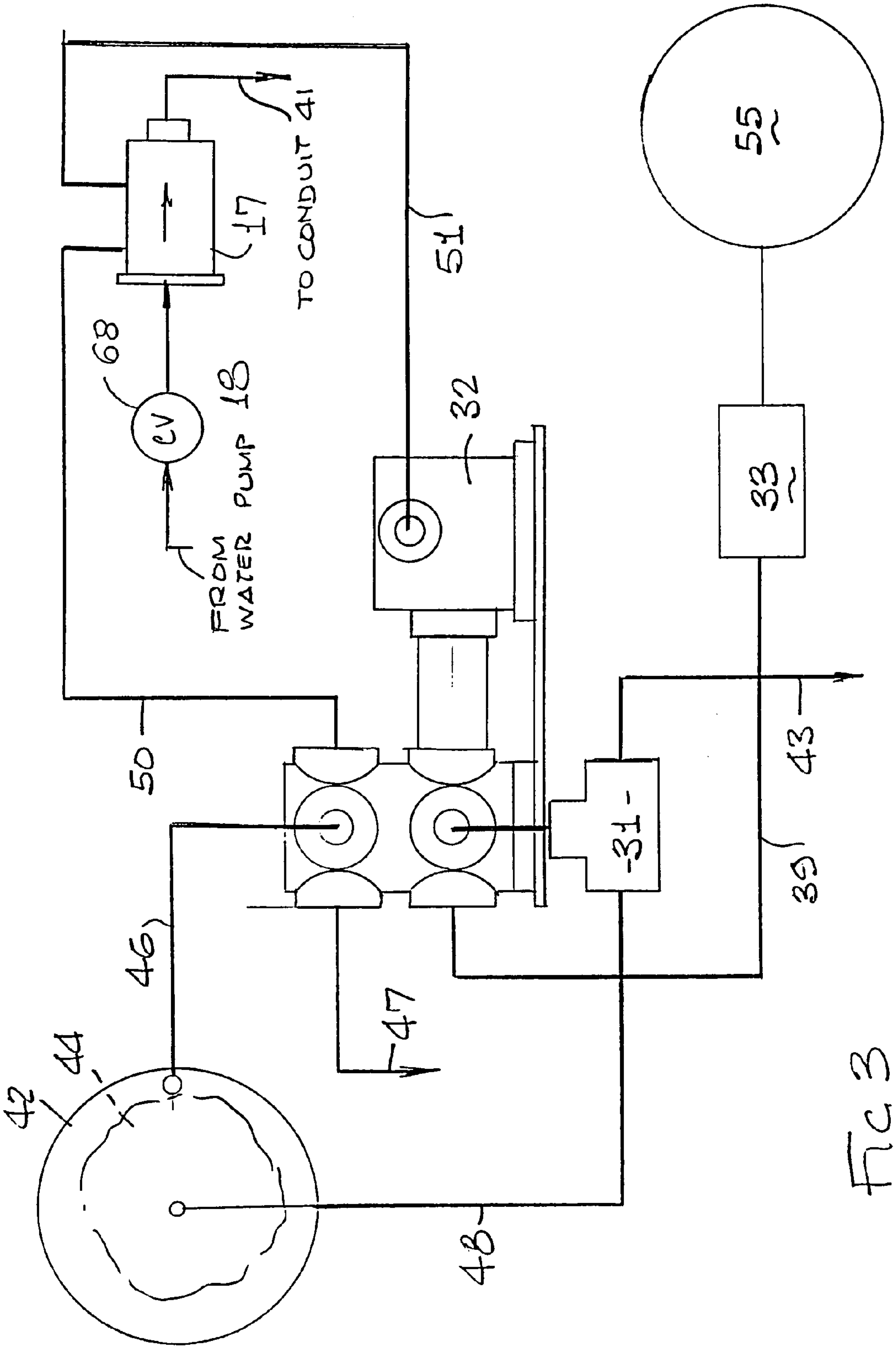
FIG. 3 is a schematic drawing of the foam supply system of FIG. 2 on an enlarged scale.

FIG. 3 is an enlarged schematic drawing of that portion of FIG. 2 including the water and foam supply system, the differential pressure valve 17, the three-way selector valve 31, and the metering valve 32. Water under pressure from water pump 18 is supplied through check valve 68 to the differential pressure valve 17 where it is mixed with foam concentrate and discharged into conduit 41.

Foam concentrate in bladder tank 42 is supplied through a line 48 to the three-way selector valve 31. This valve 31 includes a manual selector for selecting one of three positions which are "foam", "refill" and "off". Water under pressure from water pump 18 is supplied through the differential pressure valve 17, conduit 50, three-way selector valve 31, and from there via line 46 to the tank 42 where it exerts pressure against the outside of bladder 44, forcing foam concentrate into three-way selector valve 31 via line 48 and to metering valve 32. During operation when foam concentrate is required, it flows through the three-way selector valve to the metering valve 32 which is graduated to supply the desired percentage of foam concentrate to water, such as 0.2% to 1%.

Differential pressure valve 17, which is best shown and described in FIGS. 9–12 of U.S. Pat. No. 5,009,244, incorporated by reference herein and includes a pressure responsive internal plate and piston arrangement which senses the differential pressure between the high pressure at the inlet side of valve 17 and the lower pressure at the outlet side. This sensed differential pressure across valve 17 controls the proportioning of foam concentrate to water irrespective of the rate of water flow through valve 17.

When a water/foam concentrate mixture is desired, metering valve 32 is set to provide the desired ratio of foam concentrate to water. Differential pressure valve 17 responds to water pressure from pump 18 via three-way selector valve 31 to vary the water pressure through conduit 46 against the outside of bladder 44. This causes foam agent to flow through a line 48 to the three-way selector valve 31 on selector panel 30 discussed above. Foam agent in the selected proportion to water is metered in metering valve 32 which is adjusted to select precisely the desired proportion of foam concentrate to water irrespective of the volume of water flowing through differential pressure valve 17. Metering or proportioning valve 32 is shown and described in FIGS. 6–8 of U.S. Pat. No. 5,009,244 incorporated herein by reference. Foam concentrate in the selected proportion is supplied from metering valve 32 through a conduit 51 to differential pressure valve 17 where it is mixed with water. If only a foam/water mixture is desired, this mixture is supplied from differential pressure valve 17 through a conduit 41 of FIG. 2 to a water/foam solution port on the control panel 11 of FIG. 1 controlled by two-way valve 40 of FIG. 2.

Water Only Supply

If no foam is desired, metering valve 32 is closed and water is supplied from pump 18 through differential pressure valve 17 to conduit 41. This conduit is connected to a two-way valve 40 on the face of the control panel 11.

Compressed Air/Foam Supply

When a compressed air/foam mixture is desired, valve 40 of FIG. 2 is closed and water/foam concentrate is supplied from the differential pressure valve 17 through a line 53 to a foam selector metering valve 58 (FSMV). This valve includes a plurality of orifices of different sizes, any one of which may be selected for controlling the volume of water/foam concentrate, which is mixed with the air supply. The foam selector metering valve 58 may have, for example, flow settings of 10 GPM (gallons per minute), 20 GPM, 40 GPM, and 80 GPM. More or fewer orifices and different orifice sizes may be chosen. The selected flow is then supplied to an air injection venturi 84.

The foam selector metering valve 58 is shown in FIGS. 4, 5, 6, and 7, and includes a body 90, a shaft 92, a disk 94 containing a plurality of orifices 94A, 94B, 94C, 94D, 94E, and 94F., and a cover 96. The shaft 92, which is supported at one end in body 90, and at the other end in cover 96, carries disk 94, which is secured to shaft 92 by means of a pin 98, which seats in a slot 100 in disk 94. A knob or handle 58*a* on the outside of valve 58 (See FIG. 7) turns the shaft 92, which may be turned to align any of the several orifices shown between inlet passage 102 and outlet passage 104.

Figure 5:
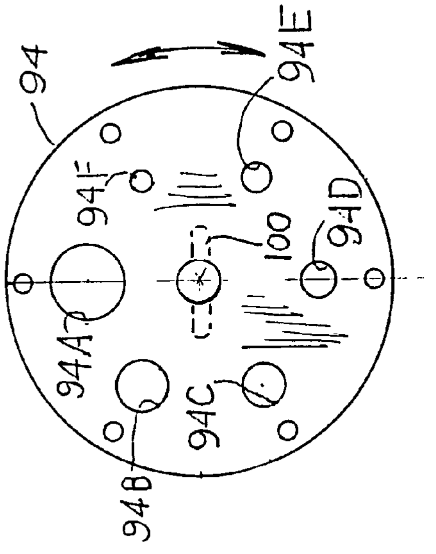
FIG. 5 is a plan view of the metering disk of FIG. 4.
Figure 4:
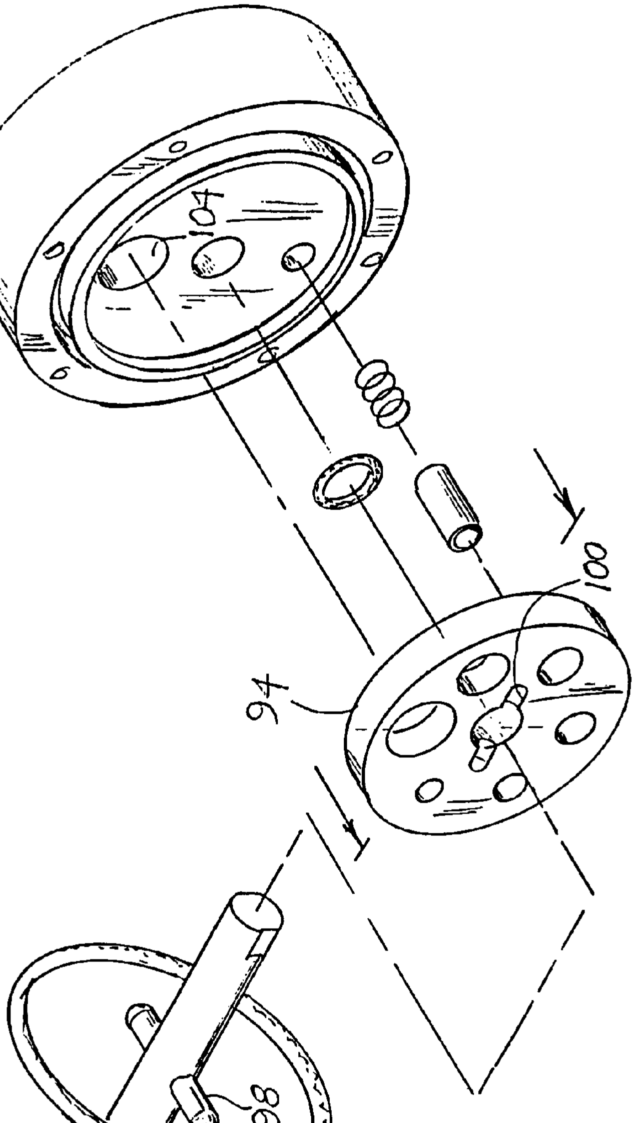
FIG. 4 is an exploded view of the foam selector metering valve.
Figure 4:
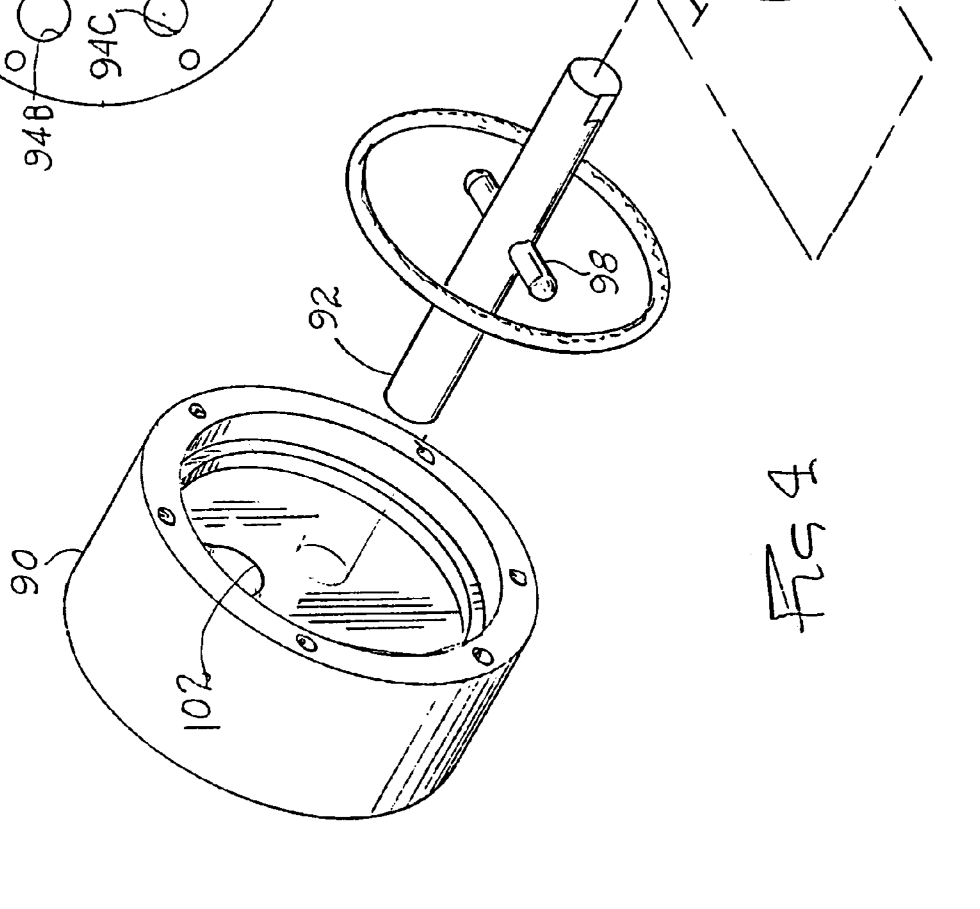

FIG. 5 is a rear elevational view of disk 94 showing its several orifices 94A–F. Slot 100 is shown in dashed lines indicating that it is not visible in this view.

Figure 6:
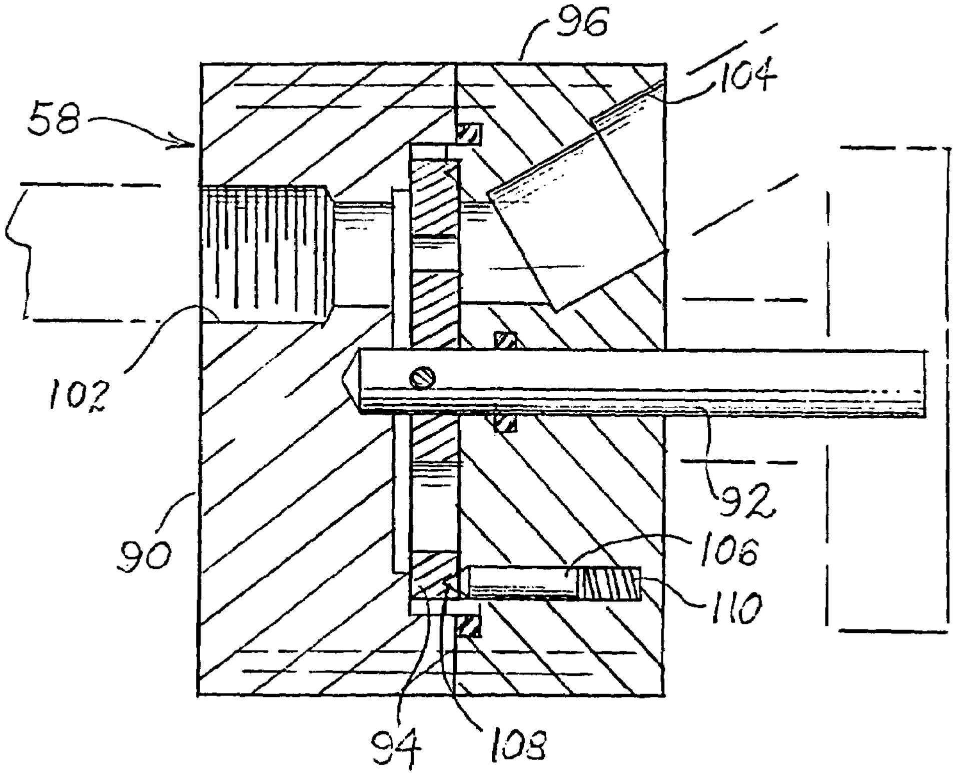
FIG. 6 is a vertical sectional view of the foam selector metering valve of FIG. 4.

FIG. 6 is a vertical sectional view through foam selector metering valve 58. In this view, shaft 92 is shown secured to disk 94 such that, by rotating disk 94, any of its several orifices may be aligned between inlet passage 102 and outlet passage 104. A pin 106 is shown urged into a detent 108 by a spring 110. There are several such detents, one aligned with each orifice to hold disk 94 in the designed selected position.

Figure 7:
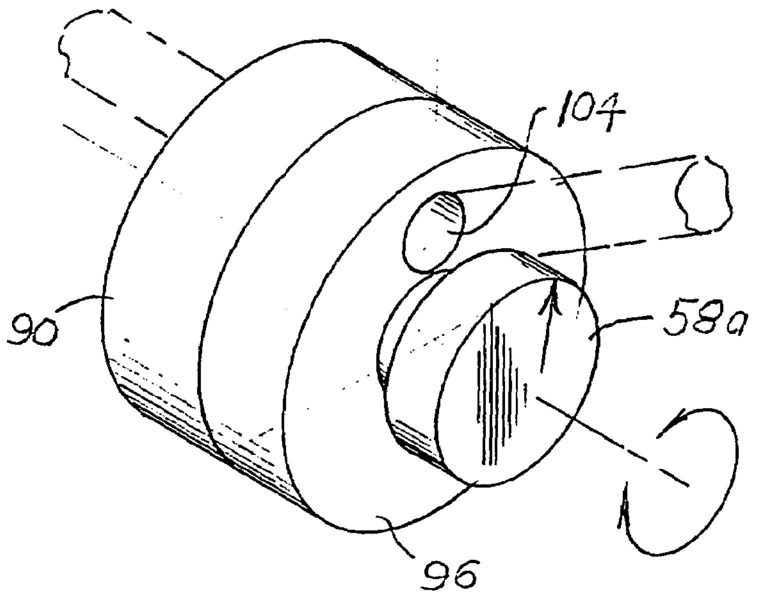
FIG. 7 is a perspective view of the foam selector metering valve of FIGS. 5–7.

FIG. 7 is a perspective view of the assembled foam selector metering valve 58. Visible in this view are the body 90, the cover 96, a knob 58*a* for turning shaft 92, and outlet passage 104. From the foregoing, it will be clear that by turning knob 58*a* to any of several positions identified by feeling pin 106 drop into a detent, a desired orifice in disk 94 can be aligned with inlet passage 102 and outlet passage 104. Particular orifices identified as to flow rates may be identified by aligning an arrow on knob 58*a* with marked positions on the control panel 11, discussed below.

Air Metering Valve

As shown in FIG. 2, compressed air from compressor 52 is supplied over line 80 past a cut-off valve 82 to an air metering valve 54. The output of the air metering valve 54 is supplied to air injection venturi 84 where it is mixed with the water/foam concentrate from foam selector metering valve 58 and the compressed air/foam mixture is supplied through a conduit 60 and a two-way valve 38 for discharge as the output of a compressed air foam system (CAFS) for fire fighting.

Valve 54, as best seen in FIGS. 8 and 9, includes a plurality of orifices sized to supply air at, for example, 25 cubic feet per minute, 35 cubic feet per minute, or 50 cubic feet per minute at the known pressure. The air metering valve 54 is very similar to valve 58. FIG. 8 is a vertical sectional view through air metering valve 54 and includes a cover 120, a body 112, a shaft 114, and a disk 116 containing a plurality of orifices of differing sizes, each corresponding to a specific volume of air supplied at a known pressure from the compressor 52 of FIG. 2.

Cover 120 contains an inlet port 122 and body 112 contains an outlet port 124. Disk 116 contains a detent 126 for each orifice position and is held in a selected radial position by means of a pin 128 urged into detent 126 by a spring 130. A knob, unshown but represented by the double-ended arrow in FIG. 8 is similar to knob 58*a* or a lever may be used to turn shaft 114 to align a desired orifice with inlet passage 122 and outlet passage 124 to provide the desired volume of compressed air.

FIG. 9 is a cross-sectional view taken along line 9—9 of FIG. 8. Body 112 is shown containing disk 116 supported on shaft 114. Disk 116 is shown with four orifices and four detents 126, one of which is radially aligned with each orifice. Shown in dotted outline because it is on the opposite face of disk 116 is a pin 132 which sits in a recessed slot 134. Pin 132 drives disk 116 radially when shaft 114 is rotated.

Air Injection Venturi

Figure 10:
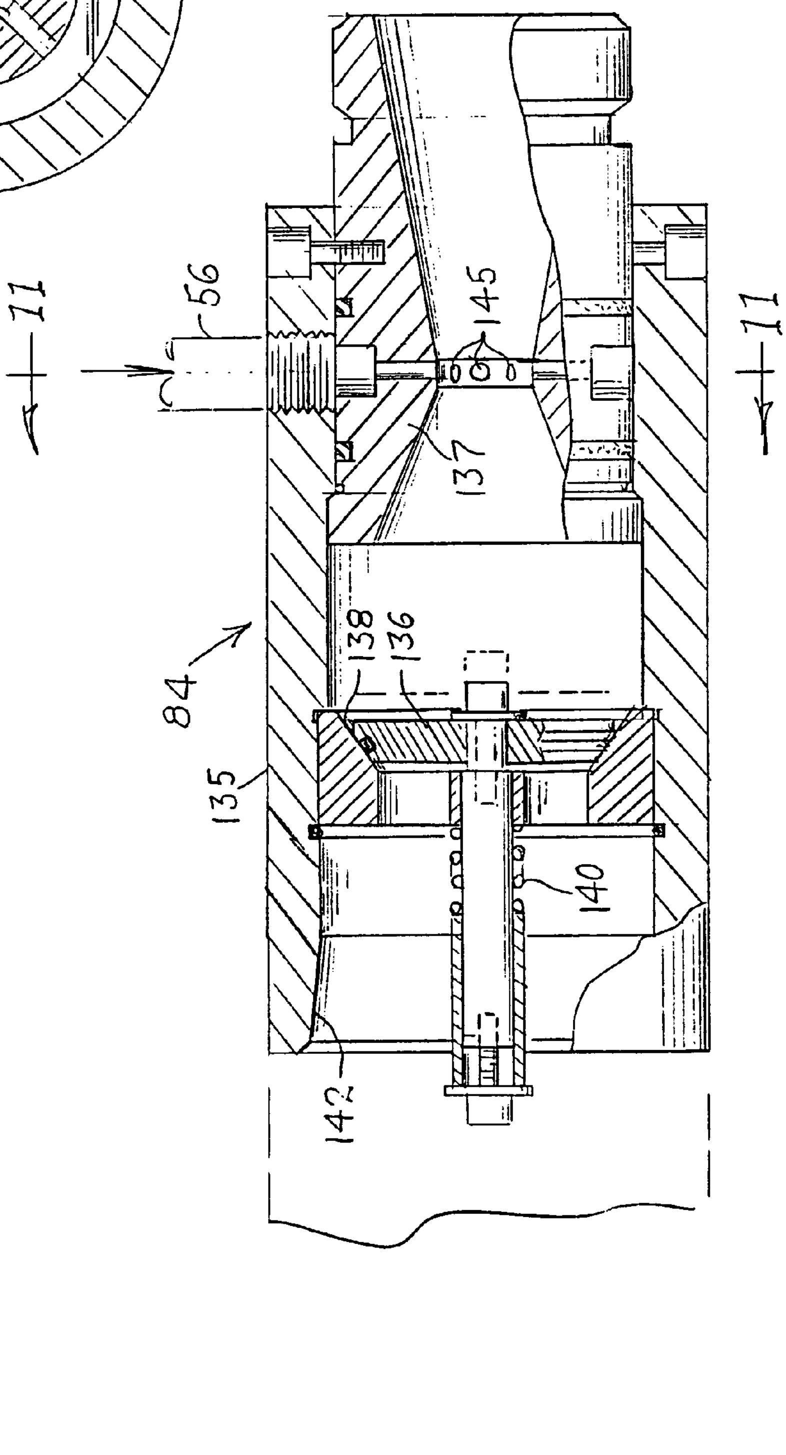
FIG. 10 is a vertical sectional view of the air injection venturi of the invention.

FIG. 10 is a vertical cross-sectional view through the air injection venturi 84. This unit provides two functions: it includes a venturi for injecting air into the water/foam solution, and a spring-loaded check valve, which blocks water/foam flow until it reaches sufficient pressure to mix properly with the air. A poppet valve 136 in a housing 135 is urged against its seat 138 by means of a spring 140. An inlet passage 142 connects with a conduit 144 from the foam selector metering valve 58 (FIG. 2). The water/foam solution crossing poppet valve 136 flows through a venturi 137, which includes a plurality of ports 145 at its throat which connect to air conduit 56 of FIG. 2. By creating a low pressure at the venturi throat, air is pulled into the stream of water/foam solution where it is combined to provide the desired mixture. The venturi outlet connects to conduit 60.

Figure 11:
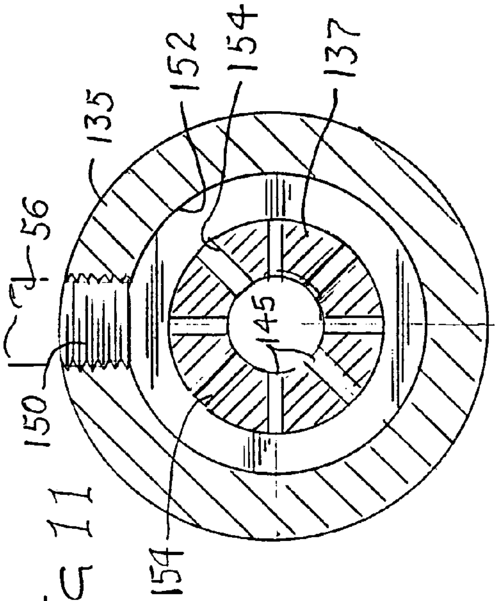
FIG. 11 is a sectional view taken along line 11—11 of FIG. 10.

FIG. 11 is a cross-sectional view taken along line 11—11 of FIG. 10. Compressed air from conduit 56 is supplied to an inlet port 150 where it enters a toroidal manifold 152 formed in venturi 137. Connected to manifold 152 are a plurality of passageways 154 leading to ports 145.

With both air and water pressure controlled and with the precisely sized orifices in both foam selector metering valve 58 and air metering valve 54, the ratio of water/foam to air remains fixed. There is no need for an operator to balance air and water/foam outputs with flow meters.

Air Only Supply

The system 10 can supply compressed air only from compressor 52 of FIG. 2 in the desired quantity as provided from the air metering valve 54. In this mode, engine E1 is shut off or declutched from pump 18, leaving no water pressure at foam selector metering valve 58. Air under pressure from air metering valve 54 flows through conduit 56, check valve 69, air injection venturi 84, conduit 60, and valve 38.

Compressor Cooling

The preferred air compressor 52 is of the oil flooded rotary screw type supplying air at a minimum of 50 cubic feet per minute of 125 psi at maximum engine RPM. The compressor 52 is driven by a toothed belt drive from the engine E2 crankshaft. Water flows through the heat exchanger 72 of FIG. 2 whenever the water pump is operating. The air compressor cooling system incorporates a thermostat that maintains the system oil temperature within a 168 to 225 degree range and is capable of maintaining recommended operating temperatures throughout the full operational range in ambient temperatures up to 115 degrees.

Unheated water from water pump 18 is supplied through a pipe 74 to a shell and tube heat exchanger 72 (HE) in FIG. 2 of all brass and copper construction. A pipe 75 carries cool oil to the lubrication system of compressor 52 where it is exposed to heat, warming the oil in the compressor 52. The resulting heated oil then flows through a conduit 76 back to the heat exchanger 72 where heat is transferred to the unheated water from pipe 74. The heated water flows from heat exchanger 72 through a pipe 78 to tank 12.

The compressor 52 is controlled by a pneumatic modulating inlet valve (not shown) mounted to the air end inlet. This controller senses air pressure and controls the air delivery of the air end while maintaining constant pressure.

Figure 12:
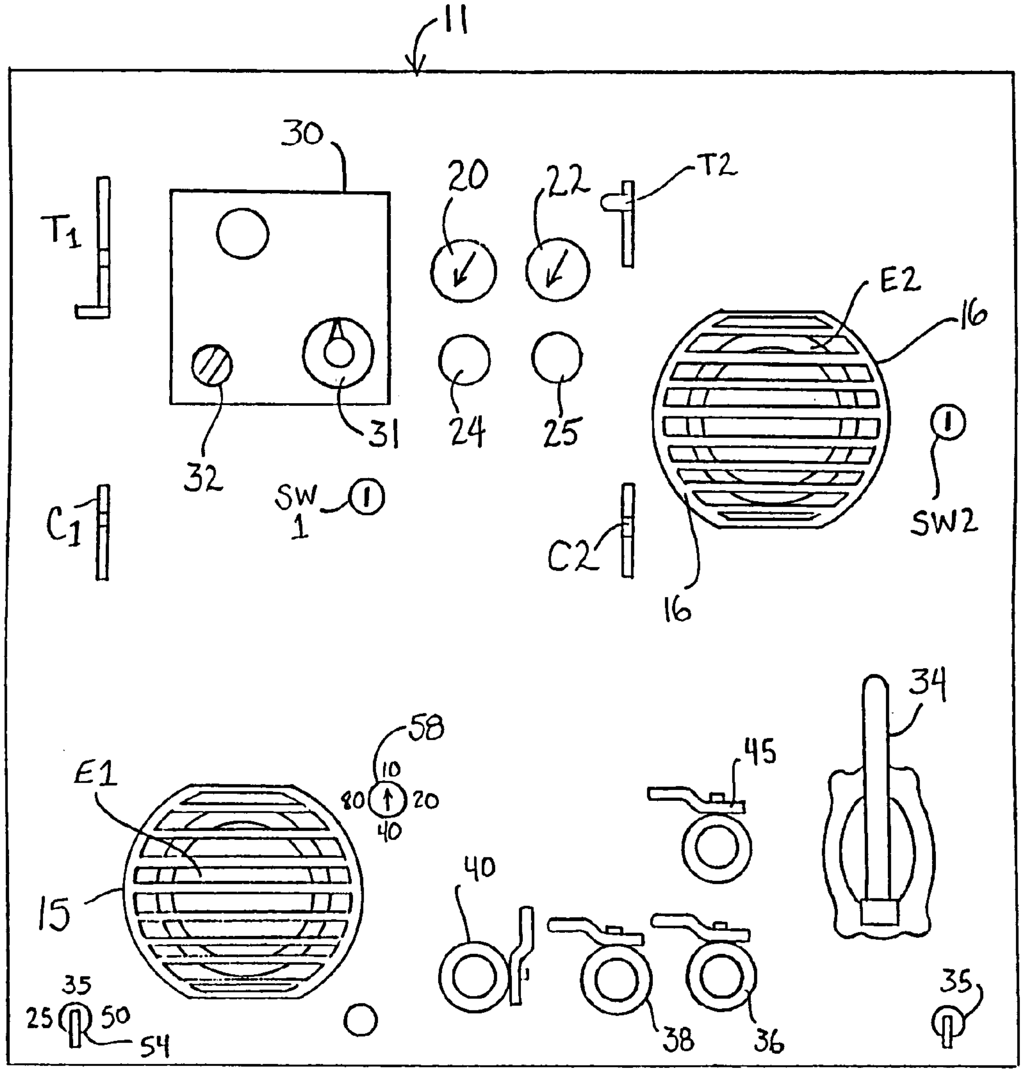
FIG. 12 is a front elevational view of the control panel of the invention.

In FIG. 12 is shown the control panel 11 of the universal fire fighting system 10. All of the controls necessary for the normal operation in compressed air foam fire fighting are present including several gages and controls for routine monitoring and maintenance of the engines. Essential water, water/foam, and air controls shown have been described above.

Near the upper left-hand corner of the panel 11, there is a key operated ON/OFF switch SW1, a throttle T1, and a choke control C1, for an engine E1 of FIG. 2, which drives water pump 18. Part of engine E1 may be seen through the cooling grid opening 15. The water pump engine E1 is an internal combustion engine, preferably a 18 horsepower air cooled Briggs & Stratton Vanguard, 2 cylinder, 4-cycle gasoline engine, which includes an alternator and a 12 volt electric starter operated by key switch SW1.

Shown near the upper right hand corner of the panel is a throttle control T2, a choke C2, as well as an ON/OFF key switch SW2 for air compressor engine E2 partly visible through grill 16. The air compressor motor E2 is conveniently located on a rear platform above the level of the hose fittings and wobble pump described below.

Upper center on the control panel are two gauges, air pressure gauge 20 and oil pressure gauge 22 for the compressor 52. Below these two operational gauges are Hobbs meters 24 and 25, which record running time for the two engines, E1 and E2.

Two other key controls are present on the control panel 11. They are the sub-panel 30, which includes controls for the metering valve 32 of FIG. 2 and of U.S. Pat. No. 5,009,244. The panel 30 includes the three-way selector valve 31 for foam proportioning with settings between 0.02% and 1%. The three-way selector valve corresponding to the selector valve of the foregoing U.S. Pat. No. 5,009,244 appears on panel 30 as selector 32, which is movable to settings of Refill, Foam, and OFF. The next major control is a three-position turn handle for controlling the air pressure in air metering valve 54 located at the lower left immediately adjacent to the grid opening 15.

A wobble pump 34 and primer control 35 are located at the lower right-hand area of the control panel for priming the water pump 18 before commencing operations.

The control panel 11 has all of the water input and output lines and each includes one of the half-inch valves controlled by quarter-turn handles, all of which are shown in FIG. 2 in the "OFF" position. The four lines are water input line 27 controlled by valve 36 (suction), air foam discharge conduit 60 controlled by valve 38, water/water foam discharge conduit 41 controlled by valve 40, and water drain 43 controlled by valve 45.

The system is intended for primary operation with a local water tank, such as a 200-gallon tank 12, loaded on or near the same skid for the system, or a larger tank up to 1000 gallons, which may be transported with the system. Whenever the system is intended to be used with another source of water, such as a hydrant line or by using the pump of the system to pull water from a stream or other source, the hydrant or other source is connected to the input line 27 and valve 21 is moved to its alternate position.

Also part of control panel 11 is the foam selector metering valve 58 which includes a valve or disc movable to one of four positions to control the volume of output of water or water/foam mixture supplied from the system 10. The disc may be movable to select, e.g., 10, 20, 40, or 80 gallons per minute of flow supplied to output conduit 60. As shown in FIG. 2, branching from output conduit 60 is a separate conduit 62, connected to the hose reel 14 for supplying power to reel the hose in, as required. System drain 35 appears in FIG. 12 on panel 11 at the lower right. Certain minor features, such as individual drains for draining the tank 42 and the pump 48 in freezing weather have not been illustrated.

Altogether, the system of this invention is believed to constitute a universal transportable fire fighting system of greater versatility than heretofore available.

The above-described embodiments of the present invention are merely descriptive of its principles and are not to be considered limiting. The scope of the present invention instead shall be determined from the scope of the following claims including their equivalents.

We claim:

1. A compressed air foam fire fighting system comprising:

a primary fluid delivery conduit;

a source of fluid;

a pump connected to said source and to said conduit to deliver said fluid through said conduit;

a first engine operatively connected to drive said pump;

a foaming agent reservoir and means for conducting foaming agent from said reservoir to said conduit;

a differential pressure valve in said conduit connected to said foaming agent reservoir;

a metering valve connected to said reservoir for varying the proportion of said foaming agent to said fluid; and conduit means for connecting said metering valve to said foaming agent reservoir and to said differential pressure valve;

an air compressor connected to said conduit;

a second engine driving said air compressor; and an air metering valve selectively varying the amount of air supplied to said conduit.

2. A system as claimed in claim 1 wherein said foaming agent reservoir includes a container and a flexible bladder in said container containing said foaming agent.

3. A system as claimed in claim 1 further comprising a valve connected between said foaming agent reservoir and said differential pressure valve for disconnecting the flow of foaming agent to said differential pressure valve.

4. A system as claimed in claim 1 wherein said system is installed within a frame carried in the bed of a pick-up truck and further comprises a control panel including starter switches for each of said first engine and said second engine, throttles for each of said engines, an oil pressure gauge, and an air pressure gauge for said compressor and a sub-panel containing selecting means connected to said metering valve for selecting a desired proportion of foaming agent to said fluid.

5. A system as claimed in claim 4 wherein said fluid is water, said control panel further comprises a valve for disconnecting said pump from said source and connecting said pump to another source of water, a valve for blocking or supplying water or water/foam solution, and a valve for supplying or blocking water/foam and air mixture.

6. A system as claimed in claim 4 wherein said control panel further includes a control for selecting a desired volume of water/foam solution and a second control for selecting a desired air flow rate.

7. A system as claimed in claim 1 further comprising a hose reel and an auxiliary conduit connected to said conduit for driving said hose reel.

8. A system as claimed in claim 1 further comprising a valve connected to said pump for disconnecting said pump from said source and connecting said pump to another source of said fluid.

9. A system as claimed in claim 1 wherein said fluid is water, said air compressor includes a lubrication system, a heat exchanger is connected to said lubrication system, and said heat exchanger includes a water passage connected to receive water from said pump for cooling said lubrication system.

10. A system as claimed in claim 1 further comprising a foam solution conduit and a foam selector metering valve in said foam solution conduit connected to said differential pressure valve, said foam solution metering valve including a rotatable plate having a plurality of different sized orifices movable into said foam solution conduit for varying the quantity of foam solution flowing through said foam solution conduit.

11. A system as claimed in claim 1 wherein said air metering valve includes a compressed air flow passage and a rotatable plate having a plurality of different sized orifices movable into said flow passage for varying the quantity of air supplied to said foam solution conduit.

12. A compressed air fire fighting system comprising:

a water pump connected to a source of water;

an engine for driving said water pump;

a water delivery conduit having an inlet connected to said pump and an outlet;

a differential pressure valve connected between said inlet and said outlet;

a foaming agent reservoir;

means responsive to water pressure at said inlet for conducting foam agent from said reservoir to said water delivery conduit to provide a mixture of foam agent and water;

an air compressor and a second engine driving said air compressor;

an air conduit connected to said air compressor;

an air metering valve for varying flow through said air conduit;

an outlet conduit including mixing means connected to said water delivery conduit downstream of said differential pressure valve and connected to said air conduit for providing a mixture of compressed air, foam and water for fighting fires.

13. A system as claimed in claim 12 further comprising an air injection venturi member having a flow passage connected to receive water/foam solution from said foam selector metering valve and a venturi member having a plurality of ports positioned at the throat of said venturi member connected to said air metering valve for mixing compressed air with said water/foam solution.

14. A system as claimed in claim 12 wherein said system is a completely integrated fire fighting system including a control panel installed within a frame and carried in the bed of a pick-up truck.

15. A system as claimed in claim 12 wherein said source of water is a tank carried on said truck, a water valve is connected between said tank and said pump, and said water valve is movable to a first position connecting said pump to said tank, and a second position connecting said pump to an external source of water.

16. A system as claimed in claim 12 wherein said air compressor has a lubrication system, a heat exchanger is connected to said lubrication system, and cooling water is supplied from said pump through said heat exchanger and back to said tank.

17. A system as claimed in claim 12 wherein said mixing means comprises an air injection venturi connected to said outlet conduit and to said air conduit having a venturi member including a plurality of ports positioned at the throat of said venturi member connected to said air conduit for mixing compressed air with said mixture of foam agent and water.

18. A compressed air fire fighting system comprising:

a source of water under pressure;

a water delivery conduit having an inlet connected to said source and an outlet;

a differential pressure valve connected between said inlet and said outlet;

a foaming agent reservoir and means responsive to water pressure from said source for conducting foam agent to said differential pressure valve to provide a water/foam solution;

a foam selector metering valve connected to said outlet for varying the proportion of foam agent to water;

a source of compressed air and an air conduit carrying said compressed air;

an air metering valve in said air conduit;

mixing means connected to said foam selector metering valve and to said air metering valve for mixing compressed air with said water/foam solution.

19. A system as claimed in claim 18 wherein said mixing means comprises an air injection venturi having a flow passage connected to receive water/foam solution from said foam selector metering valve and a venturi member having a plurality of ports positioned at the throat of said venturi member connected to said air metering valve for mixing compressed air with said water/foam solution.

20. A compressed air fire fighting system comprising:

a water pump connected to a source of water;

an engine for driving said water pump;

a water delivery conduit having an inlet connected to said pump and an outlet;

a foaming agent reservoir;

a differential pressure valve connected between said inlet and said outlet including means responsive to water pressure at said inlet for conducting foam agent from said reservoir to said water delivery conduit to provide a mixture of foam agent and water; and a control panel including a foam selector valve for varying the proportion of foaming agent and water connected to said conduit and a valve controlling the delivery of water or water/foam mixture from said conduit.

21. A system as claimed in claim 20 wherein said control panel further comprises a starter switch and throttle for said engine, a wobble pump for priming said pump, and a valve controlling the output of said conduit.

22. A system as claimed in claim 20 further comprising a valve connected to said pump for disconnecting said pump from said source and connecting said pump to another source of water.

23. A system as claimed in claim 20 further comprising a foam solution conduit and a foam selector metering valve in said foam solution metering conduit connected to said differential pressure valve, said foam solution metering valve including a rotatable plate having a plurality of different sized orifices movable into said foam solution conduit for varying the quantity of foam solution flowing through said foam solution conduit.

24. A system as claimed in claim 9 wherein heated water from said lubrication system is connected to said source.

25. A transportable universal fire fighting system including:

a frame suitable for carrying said system on the bed of a truck, said system comprising;

a tank for transporting water;

a pump for pumping water from said tank and a water conduit;

a reel in hose for dispensing fire fighting liquid from said system;

a container for carrying foam concentrate;

an air compressor;

means for connecting said system to alternate sources of water as a fire fighting fluid;

selector valve means connected to the source of foam concentrate and to said water conduit to select desired proportions of foam to water to provide a water/foam mixture;

an air injection valve, including a venturi, for introducing compressed air into said water/foam mixture;

means for powering said pump and compressor whereby said system is capable of applying any one of the following as a fire fighting fluid:

a) water;

b) water/foam combination;

c) aspirated water/foam combination; while being supplied with water selectively from said tank or from an external source.

26. A combination in accordance with claim 1 wherein said means for driving said compressor and air pump are independent engines.

27. The system in accordance with claim 25 where said frame is dimensioned to be carried on a pick-up truck or on a vehicle having a width in the order of 48 inches or greater.

* * * * *